Figure 1:
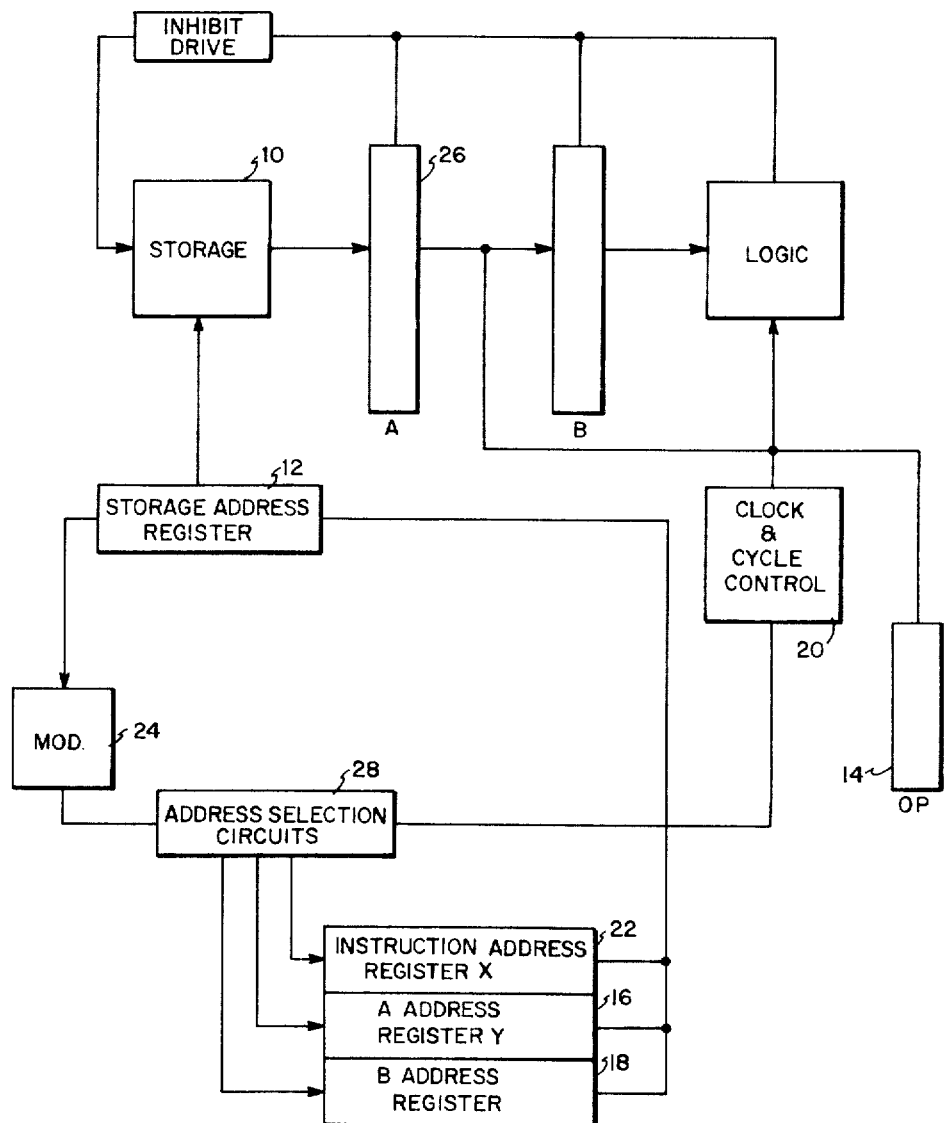

United States Patent Office 3,290,655
Patented Dec. 6, 1966

3,290,655
PROGRAM CONTROL FOR DATA PROCESSING MACHINE
Roger E. Abernathy, San Jose, Calif., assignor to International Business Machines Corporation, New York, N.Y., a corporation of New York
Filed Dec. 28, 1962, Ser. No. 247,939
4 Claims. (Cl. 340—172.5)

This invention relates to a program controlled data processing machine and more particularly to an improvement in the control of such data processing machines.

An important tool in the programming of data processing machines controlled by stored programs is the branch instruction whereby a subroutine from a program may be called into play to perform a series of operations of a frequently recurring nature. When a branch instruction is called for, the next instruction to be performed is taken not in order but generally from an address specified by the address portion of the branch instruction itself. Since the addressing and cycle controls of the data processing machine are generally set up to take the next sequential address, the execution of a branch instruction requires that the normal cycle control be interrupted and the address which is a part of the branch instruction be transferred to the register from which the machine normally addresses the next instruction. This cycling requires extra computer operating time and extra circuitry to control which it would be desirable to avoid.

It is therefore an object of the present invention to provide an improved mode of branching control of the program in a data processing machine.

It is another object of this invention to provide control for a branching operation requiring a minimum of circuitry to effect.

Still another object of the invention is to expedite a branching operation in a data processing machine without the need for transferring addresses.

It is a further object of this invention to provide control for a branching operation so that the branching operation will be completely executed within the branching instruction itself without the need for additional machine cycles.

It is generally desired to return to the point of departure from the main program after completion of the subroutine, and to do this it is necessary to preserve the next sequential address. An extra machine cycle is generally required to transfer this address to another location before processing the next instruction so that this address can be stored later to provide subroutine linkage.

It is therefore another object of this invention to provide improved control for a branching operation so that the next sequential address will be saved within the branching instruction itself without the need for additional machine cycles.

According to the invention, a more efficient method of branching in a data processing system is provided wherein, once the decision is made to branch, the branching operation is executed within the same cycle by providing electronic switching means operable under control of the branch signal for substantially simultaneously interchanging the register means containing the next sequential address and the register means containing the "branch to" address.

The foregoing and other objects, features and advantages of the invention will be apparent from the following more particular description of preferred embodiments of the invention, as illustrated in the accompanying drawings.

Figure 2:
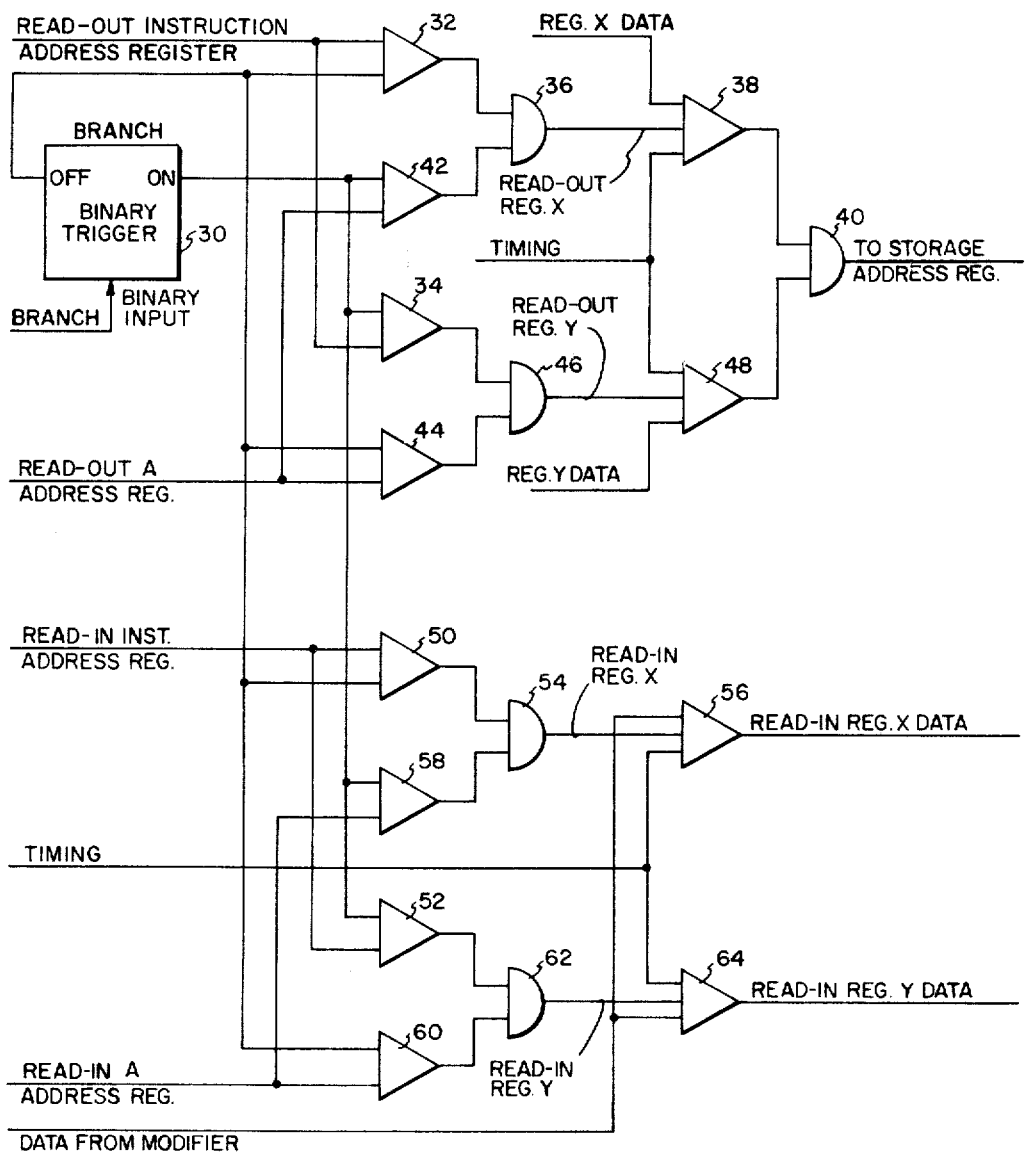
Figure 3:
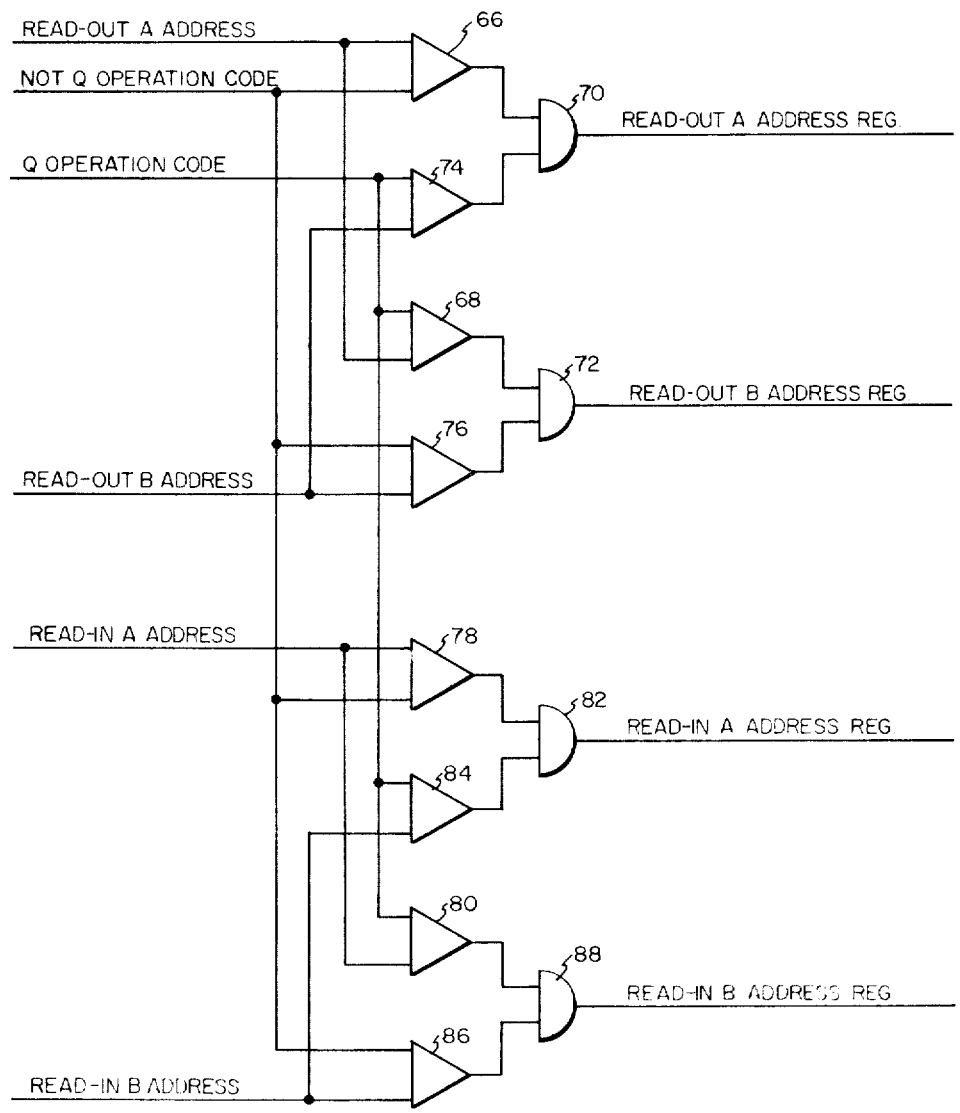

In the drawings:
FIGURE 1 is a block diagram of a data processing machine according to the invention.
FIGURE 2 is a more detailed block diagram of a part of the address selection circuit of FIGURE 1.
FIGURE 3 is a more detailed block diagram of a part of the address selection circuits of FIGURE 1.

With reference to FIGURE 1, the computer to which the invention has been applied comprises a main memory 10 for storing both data and instructions. Each character within the memory is individually addressable by the storage address register 12. Each instruction comprises a group of characters which conveys the instructional information with a part of the word pertaining to the operation that is to be performed in the computer. Another part of the word specifies the location in storage of one field to be operated upon, and the other part of the instruction specifies the location in storage of the other field to be operated upon. In the case of instructional words, there is provided for the operation portion an operation register 14, and for the address portions of the instruction, operand address registers 16, 18 are provided. The information contained in the operation register 14 functions in association with the clock and cycle controls 20 to carry out the operation specified by the instruction. There are a large number of command lines coupling the clock and cycle controls to the other elements of the machine, but these have been omitted in the drawings since they may be of conventional design and they are not necessary to an understanding of the invention.

The Instruction Address Register 22 contains the storage address of the instruction to be executed. During the instruction phase the contents of the Instruction Address Register 22 are transferred to the Storage Address Register 12 and the character at that address is read from Storage 10 into a data register 26 and thence to the Operation Code Register 14 where it defines the operation about to take place. The Clock and Cycle Control 20 is adapted to generate and distribute whatever pulses are necessary to carry out the operation that is to be performed.

The contents of the Storage Address Register are then modified by adding one and returned to the Instruction Address Register. The modification of the address is performed by Address Modifier 24. Further instruction cycles (I cycles) are taken to load the operand addresses in registers 16, 18. In a branch instruction the address of the storage location from which the next instruction will be taken if branching occurs is a part of the instruction normally stored in register 16. When it is decided to perform a branching operation, the address of the next instruction is stored in register 16 whereas the normal machine cycles are set to take the next sequential instruction address from register 22. Address selection circuits 28 are provided to interchange the read in lines of registers 16, 22 substantially simultaneously under control of the Branch Signal when a branch is to be executed within that cycles and the computer can then go on to the next instruction on the following I cycle. The controls of the computer will take what was formerly the operand address register and process the contents as if the address were in the Instruction Address Register. By interchanging the drive lines of the two operand address registers after the execution of the branch, the next sequential address is saved so that subroutine linkage can be achieved by storing this address as the first step of the subroutine.

According to the specific embodiment shown, the operation code is defined by a single character, and two operand fields of three characters each, the A Address and the B Address are provided. An instruction which may result in branching may be written in either of two basic formats. In the first type of instruction for a Branch on Condition External to Core Storage, an OP CODE and A address are used along with a digit modifier which specifies the particular condition to be tested. Since a B address is not required, none is written in the instruction. The A Address specifies the storage location from which the next instruction will be taken if the tested condition exists. The other type of branch instruction is for a Branch on Core Storage Character Test. This instruction comprises an operation code, an A address which specifies the storage location from which the next instruction will be taken if the character test is satisfied, the B address which specifies the core storage address of the character to be tested, and the digit modifier which specifies a particular test to be made upon the character at the B address.

The first type of instruction requires no execution phase, since the condition to be tested is stored in a condition register external to the core storage unit and the test can be made in the last cycle of the instruction phase and another I phase for the next instruction initiated immediately. However, if the branch condition is satisfied, the BRANCH TO address is in the A Address Register 16 whereas the machine cycles are set up to take the instruction address from the Instruction Address Register. Electronic circuit means are provided to interchange the drive lines of the A Address Register and the I Address Register after the decision to branch has been made, but still within the last cycle of the instruction phase of the branch instruction so that the normal computer cycle control can then be used on the next instruction without the need for transferring the addresses from one register to another.

The electronic circuit means to perform this function is shown in FIGURE 2 wherein a signal READ OUT INSTRUCTION ADDRESS REGISTER from the Clock and Cycle Controls 20 is coupled to the address selection circuits 28 and the registers 22, 16 which formerly were identified as the Instruction Address Register 22 and the A Address Register 16 will no longer retain that identity since a bistable gating means 30 is provided to read out one or the other of the registers depending upon the output of gating means 30. Hereafter Register Y and Register X will be used to denote registers 22, 16. The bistable gating means 30 may comprise a binary trigger, and a signal BRANCH is applied to the binary input of the trigger each time it is decided to branch. Assuming that the binary trigger 30 is set to the output marked OFF two AND circuits 32, 44 are partially conditioned and the READOUT INSTRUCTION ADDRESS REGISTER signal conditions AND circuit 32 to produce an output which is coupled through OR circuit 36 to produce the signal READ OUT REGISTER X. This signal is combined in AND circuit 38 with the Register X data and a timing pulse to produce an output which is coupled through OR circuit 40 to address the Storage Address Register 12.

A signal READ OUT A ADDRESS REGISTER (from FIG. 3) partially conditions AND circuits 42, 44 and the OFF output trigger 30 conditions AND circuit 44 to produce an output which is coupled through OR circuit 46 to produce the signal READ OUT REGISTER Y. This signal is combined in AND circuit 48 with the Register Y data and a timing pulse to produce an output which is coupled through OR circuit 40 to address the Storage Address Register 12.

Thus, it can be seen that substantially simultaneously with the decision to branch, the branch has been executed by transferring the drive lines to the register 22, 16 so that the branch instructions is executed within the branch instruction cycle. Registers 22, 16 then retain that status so far as the machine cycle controls are concerned until the next branch instruction is executed and the registers will again be interchanged. The ON output of the trigger and the READ OUT INSTRUCTION ADDRESS REGISTER conditions AND circuit 34 and thereby produces the output READ OUT REGISTER Y. The ON output of the trigger and the signal READ OUT A ADDRESS REGISTER conditions AND circuit 42 and thereby produces the output READ OUT REGISTER X. In the same manner a signal READ IN INSTRUCTION ADDRESS REGISTER partially conditions AND circuits 50, 52 and if the trigger 30 is in the OFF state, AND circuit 50 is conditioned and the output is coupled through OR circuit 54 to produce the output READ IN REGISTER X. This output is combined in AND circuit 56 with a signal from the address modifier and a timing pulse to produce the output READ IN REG X DATA. The ON output of trigger 30 conditions AND circuit 52 so that an output is produced which is coupled through OR circuit 62 to produce the output READ IN REGISTER Y. This output is combined in AND circuit 64 with a signal from the address modifier and a timing pulse to produce the output READ IN REG Y DATA.

A signal READ IN A ADDRESS REGISTER partially conditions AND circuits 58, 60 and the OFF output of trigger 30 conditions AND circuit 60 and the output is coupled through OR circuit 64 to produce the output READ IN REGISTER Y. This output is combined in AND circuit 64 with a signal from the address modifier and a timing pulse to produce the output READ IN REG Y DATA. The ON output of trigger 30 conditions AND circuit 58 so that an output is produced which is coupled through OR circuit 54 to produce the output READ IN REGISTER X. This output is combined in AND circuit 56 with a signal from the address modifier and a timing pulse to produce the output READ IN REG X DATA.

Since in most cases it is desired to return to the main program at the next sequential instruction at a later time, it is advantageous to provide a method of storing this address, which is the address in the Instruction Address Register at the time of the branch, in a place where a later branch instruction may return control to the main routine. This is generally accomplished by transferring the Instruction Address Register contents to the B Address Register before executing the branch instruction (since otherwise the address is lost) and then performing a STORE B ADDRESS instruction as the first step in the subroutine. This operation requires transfer circuitry that would not otherwise be required and a machine cycle is also required to make the transfer. Since the drive lines to registers 22, 16 are interchanged to execute the branch instruction, the next sequential address is in the A Address Register so subroutine linkage may be obtained by storing the A Address as the first instruction in the subroutine.

The STORE A ADDRESS instruction presents some difficulty since the instruction comprises an Operation Code (Q) and an A address designating the storage location at which the previous A Address Register contents is to be stored. Therefore in the normal instruction loading routine, the previous A Address Register contents, which the instruction would store in core storage, would be prematurely destroyed. This difficulty is solved in prior art machines by providing means to sense the operation code, and when a STORE A ADDRESS Operation Code (Q) is sensed, the normal instruction cycles are interrupted and an extra instruction cycle is taken to transfer the contents of the A Address Register to the B Address Register. The A Address is then loaded in the normal manner, but, during the execution portion of the instruction, the contents of the B Address Register are stored.

In a similar manner to the branch control, the subroutine linkage can also be facilitated according to the invention by utilizing electronic control means to interchange the drive lines of the A Address Register and the B Address Register when a STORE A ADDRESS instruction is decoded. A circuit to accomplish the desired interchange is shown in FIGURE 3 wherein a READ OUT A ADDRESS input will cause a read out of the B Address Register when the Q Operation Code is present. In a like manner a READ OUT B ADDRESS signal will cause a readout of the A Address Register.

The signal READ OUT A ADDRESS partially conditions AND circuits 66, 68 and a NOT Q OP CODE signal conditions AND circuit 66 to produce an output which is coupled through OR circuit 70 to produce the signal READ OUT A ADDRESS REGISTER. The presence of the Q OP CODE signal conditions AND circuit 68 and OR circuit 72 to produce the signal READ OUT B ADDRESS REGISTER. A signal READ OUT B ADDRESS partially conditions AND circuits 74, 76 and the signal NOT Q OP CODE conditions AND circuit 76 and this output is coupled through OR circuit 72 to produce the signal READ OUT B ADDRESS REGISTER. When the signal Q OP CODE is present AND circuit 74 is conditioned to produce, through OR circuit 70, the signal READ OUT A ADDRESS REGISTER.

The signal READ IN A ADDRESS partially conditions AND circuits 78, 80 and a NOT Q OP CODE signal conditions AND circuit 78 to produce an output which is coupled through OR circuit 82 to produce the signal READ IN A ADDRESS REGISTER. The presence of the Q OP CODE signal conditions AND circuit 80 and OR circuit 88 to produce the signal READ IN B ADDRESS REGISTER. A signal READ IN B ADDRESS partially conditions AND circuits 84, 86 and the signal NOT Q OP CODE conditions AND circuit 86 and this output is coupled through OR circuit 88 to produce the signal READ IN B ADDRESS REGISTER. When the signal Q OP CODE is present AND circuit 84 is conditioned to produce an output which is coupled through OR circuit 82 to produce the signal READ IN A ADDRESS REGISTER.

Thus it can be seen that the presence of the Q Operation Code (Store A Address) causes a substantially simultaneous interchange of both read in and read out lines of the A and B Address Registers so that the machine actually uses the circuitry normally used to store the B Address. This result is accomplished without the need for complex cycle interrupting circuitry or the use of a machine instruction cycle to transfer the addresses from one register to the other, and the interchange of the drive lines is temporary since it is made only when the Q OP CODE signal is present.

While the invention has been particularly shown and described with reference to a preferred embodiment thereof, it will be understood by those skilled in the art that various changes in the form and details may be made therein without departing from the spirit and scope of the invention.

What is claimed is:

1. In a data processing machine controlled by a program comprising a series of instruction steps,
   a storage means storing manifestations representing operands and other manifestations representing instructions,
   means for normally addressing said instructions successively in storage in a predetermined order,
   means for normally addressing certain operands in storage,
   means for selectively monitoring a predetermined condition which may occur during the operation of the machine in performing the program and for generating an electric signal upon the occurrence of said predetermined condition,
   means for generating control signals for utilizing the contents of said addressing means for reading out data from the designated location in storage,
   bistable gating means,
   electronic switching means, and
   means under control of the coincidence of said control signals and said condition signal to change the state of said bistable gating means to selectively condition said electronic switching means for substantially simultaneously interchanging said addressing means upon the occurrence of the predetermined condition.

2. In a data processing machine controlled by a program comprising a series of instruction steps,
   a storage means storing manifestations representing operands and other manifestations representing instructions,
   a first register for storing manifestations designating the location in storage of the next sequential instruction of the program,
   a second register for storing manifestations designating the location in storage of an operand,
   means for selectively monitoring a predetermined condition which may occur during the operation of the machine in performing the program,
   means under control of said monitoring means for selectively generating a branch signal,
   means for generating control signals for utilizing the contents of said registers for reading out data from the designated location in memory;
   bistable gating means,
   electronic switching means, and
   means under control of the coincidence of said control signals and said branch signal to change the state of said bistable gating means for substantially simultaneously interchanging said first register and said second register to execute said branch control.

3. In a data processing machine controlled by a program comprising a series of instruction steps,
   a storage means storing manifestations representing operands and other manifestations representing instructions,
   a first register for storing manifestations designating the location in storage of the next sequential instruction of the program,
   a second register for storing manifestations designating the location in storage of an operand,
   means for selectively monitoring a predetermined condition which may occur during the operation of the machine in performing the program,
   means under control of said monitoring means for selectively generating a branch signal,
   means for generating control signals for utilizing the contents of said registers for reading out data from the designated location in memory,
   bistable gating means having an input and two outputs,
   a first and a second coincidence means,
   means for coupling said control signals to partially condition said coincidence means,
   means for coupling said branch signal to control the state of said bistable gating means, and
   means for coupling each of the outputs of said bistable gating means to condition one of said coincidence means to substantially simultaneously interchange said registers to execute said branch control.

4. In a data processing machine controlled by a program comprising a series of instruction steps,
   a storage means storing manifestations representing operands and other manifestations representing instructions,
   a first register for storing manifestations designating the location in storage of the next sequential instruction of the program,
   a second register for storing manifestations designating the location in storage of an operand,
   means for selectively monitoring a predetermined condition which may occur during the operation of the machine in performing the program,
   means under control of said monitoring means for selectively generating a branch signal, a first and a second coincidence means each having a plurality of inputs and an output, means for generating control signals for utilizing the contents of said registers for reading out data from the designated location in memory, bistable gating means having an input and two outputs, means for coupling said control signal to one input to partially condition said coincidence means, means for coupling one output of said bistable gating means to an input of said first coincidence means, means for coupling the other output of said bistable gating means to an input of said second coincidence means, means for coupling the output of said first and second coincidence means to control said first and second registers, and means for coupling said branch signal to change the state of said bistable gating means for substantially simultaneously interchanging said registers to execute said branch control.

References Cited by the Examiner

"Digital Computer Design Fundamentals," October 1962, Yaohan Chu, McGraw-Hill Book Co., pgs. 456–459.

ROBERT C. BAILEY, *Primary Examiner.*

M. LISS, *Assistant Examiner.*